Oct. 12, 1954

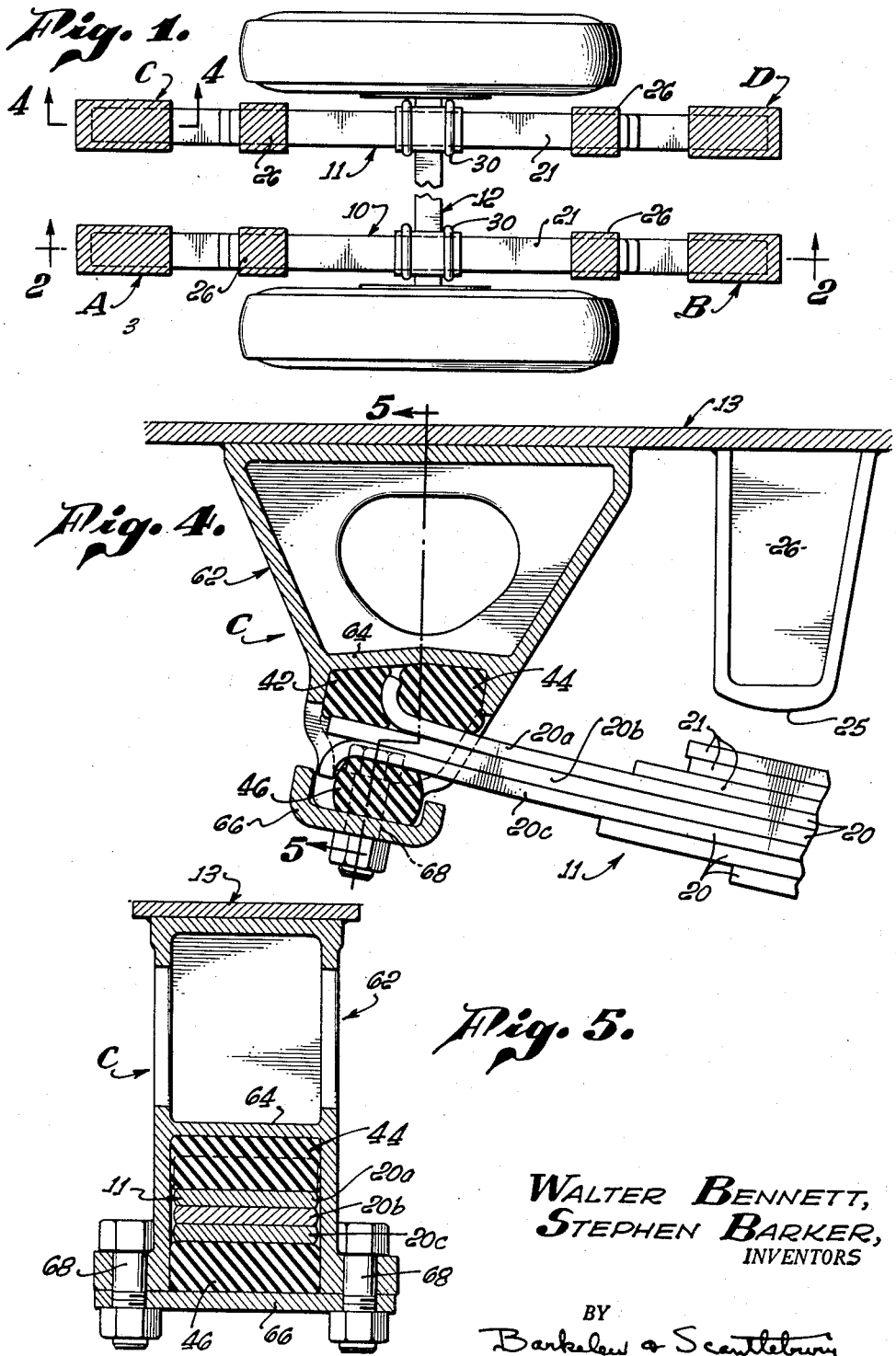

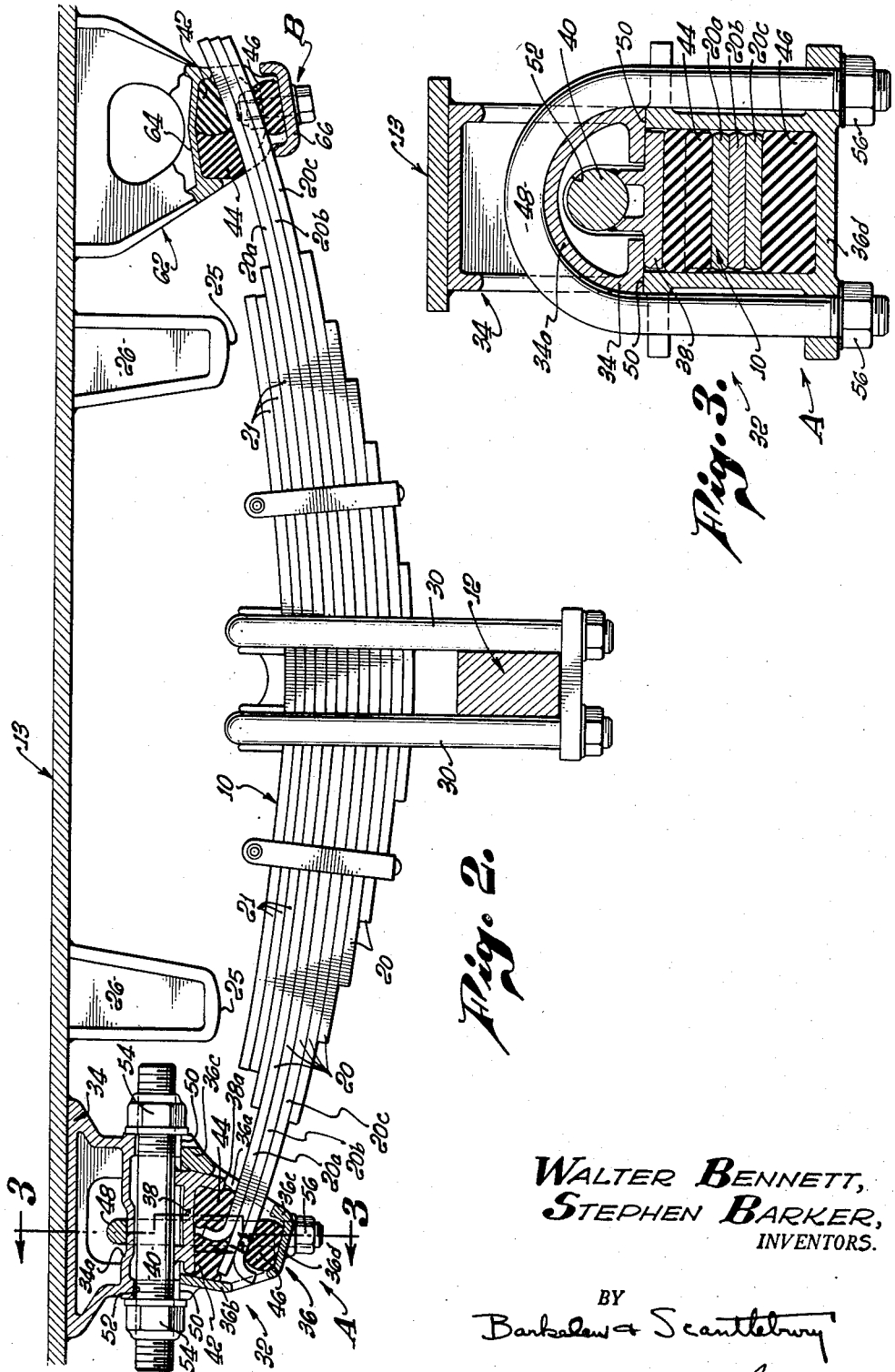

W. BENNETT ET AL 2,691,519

SPRING SUSPENSION SYSTEM FOR VEHICLES

Filed Aug. 18, 1952

WALTER BENNETT,
STEPHEN BARKER,
INVENTORS.

BY

Barkalew & Scantlebury

ATTORNEYS.

Patented Oct. 12, 1954

2,691,519

UNITED STATES PATENT OFFICE 2,691,519

SPRING SUSPENSION SYSTEM FOR VEHICLES

Walter Bennett, Los Angeles, and Stephen Barker, Alhambra, Calif., assignors to Utility Trailer Manufacturing Company, Los Angeles, Calif., a corporation of California Application August 18, 1952, Serial No. 305,052

4 Claims. (Cl. 267—30)

This invention relates to spring suspension systems for vehicles. Certain aspects of the invention have to do with the mounting, shackling and the functioning of the vehicle suspension spring (here, the primary spring) whether or not a supplemental or overload spring is used in the system. And certain other aspects of the invention have to do with the inclusion in the system of a supplemental spring such as is shown in, and of itself is the subject matter of, another prior application identified hereafter. Those and other aspects and accomplishments of the invention will be best understood from the following detailed description of certain preferred forms of the invention shown in the accompanying drawings, in which:

Fig. 1 is a schematic plan showing a vehicle axle carried by two spring units in accordance with the invention;

Fig. 2 is a sectional elevation taken as on line 2—2 of Fig. 1, showing one spring unit and its mountings;

Fig. 3 is a cross-section on line 3—3 of Fig. 2;

Fig. 4 is a section on line 4—4 of Fig. 1, and

Fig. 5 is a section on line 5—5 of Fig. 4.

Figure 2A:
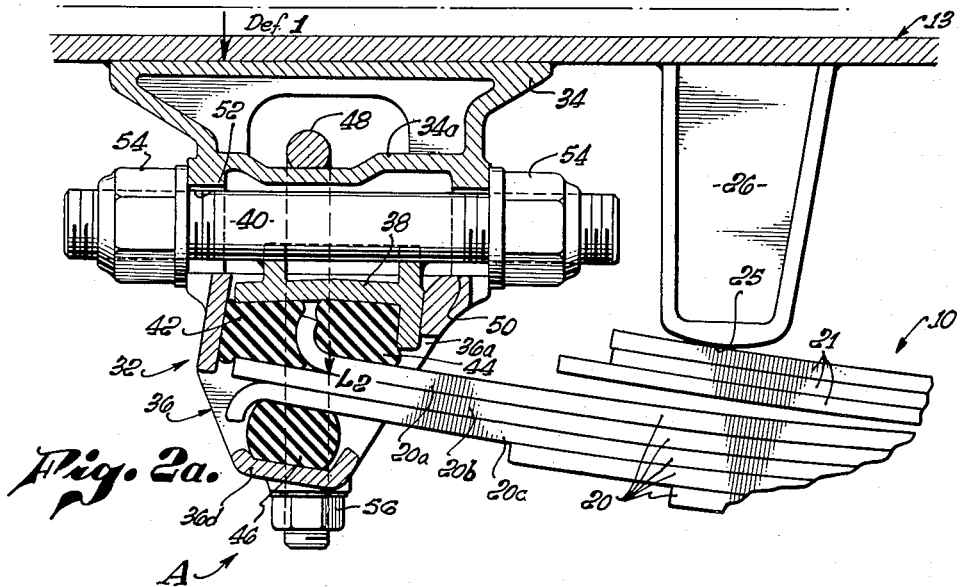
Figs. 2a and 2b show the left hand portions of Fig. 2 in positions of progressively greater spring deflection under load.

Fig. 1 of the drawings depicts in schematic plan the general layout of two spring units 10 and 11, and axle 12 or other equivalent load bearing member to which they are fixedly attached; indicating their end mounting shackles or brackets at A, B, C and D. Fig. 2 shows the preferred structure and arrangement of one of the composite spring units and the mountings of the unit 10 at A and B. Mountings A and C, as here shown, are such as to position the spring units 10 and 11 longitudinally and thus to locate axle 12. The mountings at B and D are therefore such as to allow relative longitudinal movements of their spring ends. Those mountings at B and D are here shown as being mounted directly on the vehicle frame (13 in Fig. 2); but, as will be readily understood from what follows, those mountings at B and D might well be on rocker arms such as the rocker arms of a two-axle suspension.

As here shown in preferred form, each spring unit 10 (or 11) is composed of a number of primary spring leaves 20, which, in their general arrangement and relations, are very much like an ordinary leaf spring, and have their three uppermost leaves 20a, 20b and 20c longer than the others; and of a number of supplemental or overload spring leaves 21, here preferably shown as three leaves which preferably lie at their centers directly on the center portion of the primary spring, which are preferably shorter than the upper leaves of the primary and lie on the primary leaves throughout their lengths when all the leaves are under little or no load. The three supplemental leaves 21 may be, as shown, of substantially equal lengths and their outer ends lie under downwardly facing spring seats 25 which are here formed by the downwardly facing end surfaces of seat members 26 which are mounted under the vehicle frame 13.

Fig. 2 shows the mountings of the spring unit 10 and shows that unit under no load or under a minimum load such as that of the unloaded vehicle. The center of the whole spring unit 10 is fixedly attached to axle 12 in any suitable manner, as by a clamping means involving yoke bolts 30, so that the axle is fixed with relation to the spring and longitudinal adjustment of spring position on the vehicle frame will correspondingly adjust and set the fore and aft position of the associated end of the axle. The left hand end of spring unit 10 is mounted in a spring shackle 32 to be set fixedly in a longitudinally adjusted position on the vehicle frame. The preferred structure of that mounting shackle is shown in Figs. 2 and 3.

The adjustable shackle mounting for the spring shown in those figures comprises as main parts the shackle base 34 which is welded to the under face of vehicle frame 13; an adjustable shackle member 36 which seats upwardly on base 34; a slider 38 which also seats upwardly on base 34 and is adjusted in position by an adjusting screw 40; several rubber spring-seat blocks 42, 44 and 46; and a U-bolt 48 which clamps the slider and shackle in adjusted position on the shackle base. The shackle base, secured rigidly to the vehicle frame, is of general box formation with lower bearing faces 50 against which the shackle 36 and slider 38 bear upwardly. Slider 38 is welded to adjusting screw 40 which extends loosely through openings 52 in the end walls of shackle base 34—loosely, so that the upward thrust of shackle and slider is not carried by the screw. Nuts 54 on the ends of the screw serve to set slider 38 in desired longitudinal position. Shackle member 36, as seen from Figs. 2 and 3, is of general box form and surrounds slider 38. Longitudinal adjustment of the slider therefore effects longitudinal adjustment of position of shackle member if the clamping bolt 48 is loosened. After adjustment of the longitudinal position, setting up the nuts 56 on the clamping bolt then clamps member 36 tightly to 34 and thus sets 36 and 38 in the longitudinally adjusted position. Shackle base 34 has an interior web 34a over which U-bolt 48 passes.

The ends of spring leaves 20a, 20b and 20c project into the interior of the box-like shackle member 36 through an opening 36a in one of its walls. The extreme end of upper leaf 20a is turned up, the extreme end of lower leaf 20c is turned down, while the end of 20b projects straight. The rubber block 42 lies under slider 38, over the end of 20b and between the upturned end of 20a and wall 36b of the shackle member. Rubber block 44 lies over 20a, under slider 38 and between the upturned end of 20a and a downturned end lip 38a of slider 38. The third rubber block 46 lies under leaf 20c, between it and lower wall 36d of shackle member 36 and between the downturned end of 20c and the opposite end wall 36c of the shackle. In the load condition of Fig. 2 (minimum load on the springs) all three rubber blocks are under a substantial degree of vertical pre-compression. And the upper blocks 42 and 44 are also under a substantial degree of longitudinal pre-compression. And the free vertical dimension of left hand block 42 is approximately the same as that of right block 44; so that, in the spring position of Fig. 2 with the left hand end of leaf 20b projecting up to compress the left hand end of block 42 more than block 44 is compressed, the load imposed through the rubber blocks onto the spring is largely taken by the extreme outer end of 20b, giving a relatively soft spring action.

Longitudinal positioning of the spring, and therefore of the axle end to which the spring is attached, is effected primarily by the holding of upturned leaf end 20a between the two upper blocks 42 and 44 which are preferably pre-compressed longitudinally. The axle positioning, although always having the yielding quality of the rubber blocks, can be increased in its rigidity to any desired degree by increasing the longitudinal dimensions and therefore the longitudinal pre-compression of those rubber blocks. That rigidity is preferably such that in normal operation the end of leaf 20b will not contact wall 36b, although that wall does form a final positive stop to the relative movement of the spring toward the left in Fig. 2. And the downturned outer end of 20c engaging lower block 46 on any excessive movement of the spring toward the right, effectually limits that relative movement. It may be remarked that, particularly where this described spring suspension is applied to a trailer, the left hand end in Fig. 2 is usually the end toward the front of the trailer; although that is not always necessarily so.

The preferred mounting for the forward end (left hand end in the figures) of the opposite spring unit 11, is shown in Figs. 4 and 5. That mounting may be a duplicate of the longitudinally adjustable mounting of the forward end of spring unit 10; but, seeing that longitudinal adjustment of only one end of the axle is necessary for aligning the axle at right angles to the vehicle axis, the forward end mounting of unit 11 omits adjustability in the interest of simplicity.

Spring unit 11 is a duplicate of unit 10 and corresponding parts are similarly numbered. The end formations of the spring leaves 20a, 20b and 20c, and their relations to the rubber blocks 42, 44 and 46, are the same as has been explained for Fig. 2. The rubber blocks are confined in a shackle formation 62 which presents an internal fixed wall 64 in a position corresponding to that of slider 38 in Fig. 2, to present the same downwardly facing seat surfaces for the blocks 42 and 44. The bottom of shackle 62, corresponding in position to wall 36d of Fig. 2 and presenting the same seat for block 46, is formed by a bottom plate 66 held in place by bolts 68. The structure and functioning of the shackle 62, forming the mounting at C, Fig. 1, for the left hand end of spring unit 11, are the same as for the mounting at A for the left hand end of unit 10, except for longitudinal adjustability.

The two spring mountings at positions B and D (Fig. 1) for the right hand or rear ends of the two spring units 10 and 11 are duplicates and, as shown in the right hand portion of Fig. 2, are, in their shackle structure, the same as that of Fig. 4. The shackle 62 has the same internal wall 64 and the same bottom plate 66, supporting and confining the several rubber blocks 42, 44 and 46 in the same manner. The only difference is in the fact that spring leaves 20a and 20c do not have upturned and downturned ends. The three upper leaves 20a, 20b and 20c project straight through the shackle between blocks 42 and 44 on top and 46 on bottom. These spring leaves, although thus confined vertically by the vertically precompressed rubber blocks the same as in shackle 32 or 62 (at positions A and C of Fig. 1), are not confined longitudinally at all but can move longitudinally through the shackles to allow for the effective change of spring length that accompanies changing vertical deflection.

In practice, the rubber blocks 42 and 44 for the mountings at B and D are conveniently duplicates of the blocks 42 and 44 of the mountings at A and C. Those at B and D, as is apparent, might as well be single blocks of the total size of 42 and 44, so far as function at B and D is concerned. Those at B and D may be somewhat longitudinally compressed, although that is not necessary; but those at A and C are preferably longitudinally pre-compressed to some substantial degree.

The spring mountings and shacklings that have been described for primary springs 20 in positions A, B, C and D may be utilized either with or without the supplemental or overload springs 21 and their seatings 25; and, as before mentioned, the mountings of the right hand ends of the primary springs 20 may be on rocker arms in a two axle assembly. But the particular rubber block mountings of the primary springs lend themselves well to the function of progressive spring loading when used in combination with the supplemental or overload springs; as will now be explained. For this purpose, reference is had particularly to Figs. 2, 2a and 2b. These figures illustrate the progressive spring loading conditions which obtain specifically at mounting A of Fig. 1 as loads are increased; but the following applies to all four spring mountings.

Fig. 2 represents the deflection position of the spring unit under minimum load; typically under the dead load of the unloaded trailer. In that condition, the upper supplemental leaves 21 preferably, though not necessarily, rest, without being under any appreciable strain, upon the uppermost primary leaf 20a; that is, they have substantially the same free curvature as the lower primary leaves. The outer ends of leaves 21 lie spaced below the supplemental spring seat 25. The primary leaves 20, in that condition, bear the usual relation to each other—they all have substantially the same free curvature.

Fig. 2a shows a typical spring position in which the primary spring leaves 20 are deflected under a load that brings frame 13 down by such an amount as indicated at "Def. 1" and brings the supplemental spring seat 25 down onto the supplemental spring 21, so that the latter then begins to take a part of the load as it increases.

Figure 2B:
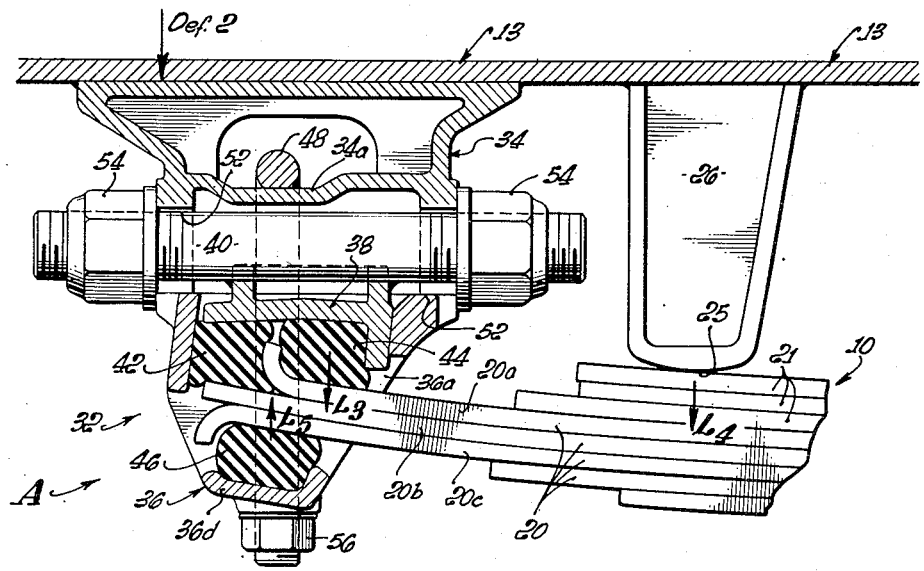

As the load has increased from that of Fig. 2 to that of Fig. 2a and as the outer portions of primary leaves 20 become more nearly horizontal, rubber block 42 is relatively de-compressed while block 44 is relatively more greatly compressed. Assuming that the two blocks have such relative vertical dimensions that in the condition of Fig. 2 the vertical compression of one bears any definite ratio (say unity) to that of the other, then upon spring deflection which lowers the outer end of 20b under 42, more than the outer part of 20a is lowered under 44, the center of load pressure on the spring has moved toward the center of the spring. Thus, in the condition of Fig. 2 the load center may be approximately at L1, in Fig. 2a at approximately L2, and in Fig. 2b where the spring is further deflected, approximately at L3, insofar as load imposed through blocks 42 and 44 is concerned. Thus, as the spring deflection increases under increasing load, the effective length of the primary spring becomes shorter and the spring stiffer. That action is true of the spring mountings at B, C and D (Fig. 1) as well as of the mounting at A.

The spring system reaches the condition of Fig. 2a, where the supplemental spring 21 begins to take a part of the load, when the vehicle frame and the primary spring mountings have moved down approximately the distance ("Def. 1") which supplemental spring 21, in unstressed condition, lies below seat 25. On further downward movement, the part of primary spring 20 directly under the supplemental seat 25 and the part of supplemental spring 21 does not move down as fast as the outer ends of the supplemental spring. Consequently, in some such position as shown in Fig. 2b, where typical total deflection of frame 13 is indicated by "Def. 2", the outer parts of 21 which lie under seat 25 set down again on the medial portion of primary 20. From that position on, under further load and deflection, the major portion, or all, of the load is supported through seat 25 and the combined spring 20, 21 acting at the short length of the supplemental spring and therefore at maximum stiffness. In setting down on spring 20, the upper supplemental spring 21 sets down progressively from the spring center out, so that the stiffness of the supplemental spring progressively increases as it reaches the position of Fig. 2b.

The relation of supplemental spring 21 to primary spring 20 and to supplemental seat 25, so that the load on supplemental spring 21 is partially transferred to and carried by primary spring 20 at shortened length as the supplemental spring sets down on the primary, is, in itself, and in combination with, broadly, the seating for the primary spring which causes its effective length to shorten as the load increases, not claimed in this application: being the subject matter of application Ser. 233,311, filed June 25, 1951, by Walter Bennett. The primary spring mountings which are here described; and the cooperative functioning of the primary and supplemental springs, mountings and seats now to be described, are the subject matters of claims here.

In such a relative position of the springs, mountings and seats as shown in Fig. 2b, with the supplemental seat 25 in effect pressing down on the medial portion of primary 20 at a point directly below the seat, further depression of seat 25 by any given amount tends to cause depression of the outer ends of primary 20 by a greater amount. Rubber block 46, which has a vertical dimension sufficient to at least fill the vertical space between lower leaf 20c and the bottom shackle wall in the condition of Fig. 2 or 2a (or it may preferably be vertically pre-compressed in those conditions), opposes that additional downward movement of the outer end of the primary spring. Thus, in about the condition of Fig. 2b, and in conditions of still greater load deflection, the major portion or all of the direct load is taken by the combined spring 20, 21 at about the load location indicated by L4 in Fig. 2b; or by the primary alone, at L4, if the supplemental spring 21 is not used. In either case the lowering of primary 20 at L4 under seat 25 causes the outer end of 20 to lower, or tend to lower, more than at L4. The relative lowering of the outer ends of 20a—20c relatively takes the load L3 off the blocks 42 and 44, de-compressing those blocks and compressing block 46 on seat 36d. Block 46 then exerts a force such as indicated by L5 on 20c, opposing the relative lowering of 20c. Thus, in such a condition of spring deflection, the deflection is not only opposed by the spring action of the primary 20, or of the combined spring 20, 21, acting at a shortened length from its center determined by the position of L4, but also by the stressed spring action in the length of primary leaves 20a, b and c lying between L4 and L5. The action there is that of the end moment of a continuous beam.

That action does not necessarily depend on supplemental spring 21 being present, as has been indicated above. For instance, if the spring function of 21 is ignored, the leaves 21 may be regarded merely as filler between seat 25 and upper main leaf 20a, or in effect as an extension of 25. In either of those circumstances the last described action of the outer parts of the primary spring will take place.

We claim:

1. In combination with a vehicle supporting leaf spring which has a free end which extends in a generally horizontal direction, shackle means mounted on the vehicle frame and engaging the free spring end, said shackle means embodying a box-like shackle structure with upper and lower walls above and below the free spring end, the free spring end having an upturned end portion and also a portion extending longitudinally beyond the upturned portion, and the shackle structure having end walls located spacedly at opposite sides of the upturned end portion, a pair of rubber blocks held in the shackle structure between the upper face of the spring end and the upper shackle wall, the two blocks being held at opposite sides of the upturned spring end and between it and the end walls, and a third rubber block held in the shackle structure between the lower face of the spring end and the lower shackle wall, all said blocks being held in vertical pre-compression and the two upper blocks being held in horizontal pre-compression between the two end walls.

2. In combination with a vehicle supporting leaf spring which has a free end extending in a generally horizontal direction, the spring end having an upturned and a downturned portion and also a portion extending longitudinally beyond the upturned portion, a box-like shackle structure with upper and lower walls above and below the free spring end and with end walls lying at opposite sides of the upturned and downturned spring end portions, means for setting said shackle structure in a longitudinally adjusted position on the vehicle frame, a pair of rubber blocks held in the shackle structure between the upper face of the spring end and the upper shackle wall, the two blocks being held at opposite sides of the upturned spring end and between it and the two end walls, and a third rubber block held in the shackle structure between the lower face of the spring end and the lower shackle wall and between the downturned spring end portion and one of the shackle end walls, all said blocks being held in vertical pre-compression and the two upper blocks being held in horizontal pre-compression between the two end walls.

3. A suspension spring unit of the character described for supporting a vehicle frame on a load supporting member, comprising the combination of a primary leaf spring having its base portion attached to the load supporting member, shackle means mounted on the vehicle frame and engaging the free outer end of the primary leaf spring for imposing frame-supported load thereon and also acting to limit downward movement of said free outer end with relation to the frame, other means connecting the spring to the vehicle frame and acting to oppose rotation of the base portion of the spring in a vertical plane, a relatively short supplemental leaf spring attached to the load supporting member and lying with its free end directly above an intermediate point in the length of the primary spring and adapted to seat downwardly on said intermediate point when the ends of both springs are depressed under load, a downwardly facing load-applying seat associated with the vehicle frame and adapted to bear down on the free end of the supplemental spring, the free end of the supplemental spring when under relatively light load being normally spaced above said intermediate point of the primary spring by such distance as to move down into load applying engagement with the intermediate point of the primary spring under relatively heavier loads, all whereby the primary spring takes heavier loads from said downwardly facing load-applying seat through the free end of the supplemental spring at a relatively shortened spring length, and whereby a continuous beam moment is set up in the primary spring in its length between the end shackle means and said intermediate point in its length under the load applying seat.

4. In combination with a vehicle supporting leaf spring which has a free end that extends in a generally horizontal direction, the free end of the spring having an upturned end portion and also a portion extending longitudinally beyond the upturned portion, a shackle means mounted on the vehicle frame and engaging the free spring end, said shackle means comprising a shackle base secured to the vehicle frame, a box-like shackle member having an open upper end and having an upper surface seating upwardly on a lower surface of the base and having a lower wall and end walls, a slider confined longitudinally between the end walls within the upper open end of the box-like shackle member and seating upwardly on a lower surface of the base, both the shackle member and the slider adapted to slide longitudinally on the base, means adjustably setting the position of the slider and of the confining shackle member on the base, means clamping the shackle member against the lower face of the base, said box-like shackle member receiving the end portion of the spring and having two spring confining rubber blocks lying between the slider and the upper face of the spring and between the upturned portion and the end walls, and another rubber block lying between the shackle bottom wall and the lower face of the spring, all said blocks being held in vertical pre-compression and the two upper blocks being held in horizontal pre-compression between the end walls and the upturned spring portion.

References Cited in the file of this patent

UNITED STATES PATENTS

| Number | Name | Date |
|---|---|---|
| 1,496,237 | Leipert | June 3, 1924 |
| 2,054,305 | Stilwell | Sept. 15, 1936 |

FOREIGN PATENTS

| Number | Country | Date |
|---|---|---|
| 231,960 | Great Britain | Apr. 16, 1925 |
| 249,651 | Great Britain | Apr. 1, 1926 |
| 503,874 | Germany | July 28, 1930 |
| 966,729 | France | Mar. 8, 1950 |